J. J. WALSER.
PRINTING AND FOLDING MACHINE.
APPLICATION FILED SEPT. 20, 1917.

1,373,216.

Patented Mar. 29, 1921.
9 SHEETS—SHEET 1.

INVENTOR
J. J. Walser
BY
John D. Morgan
ATTORNEY

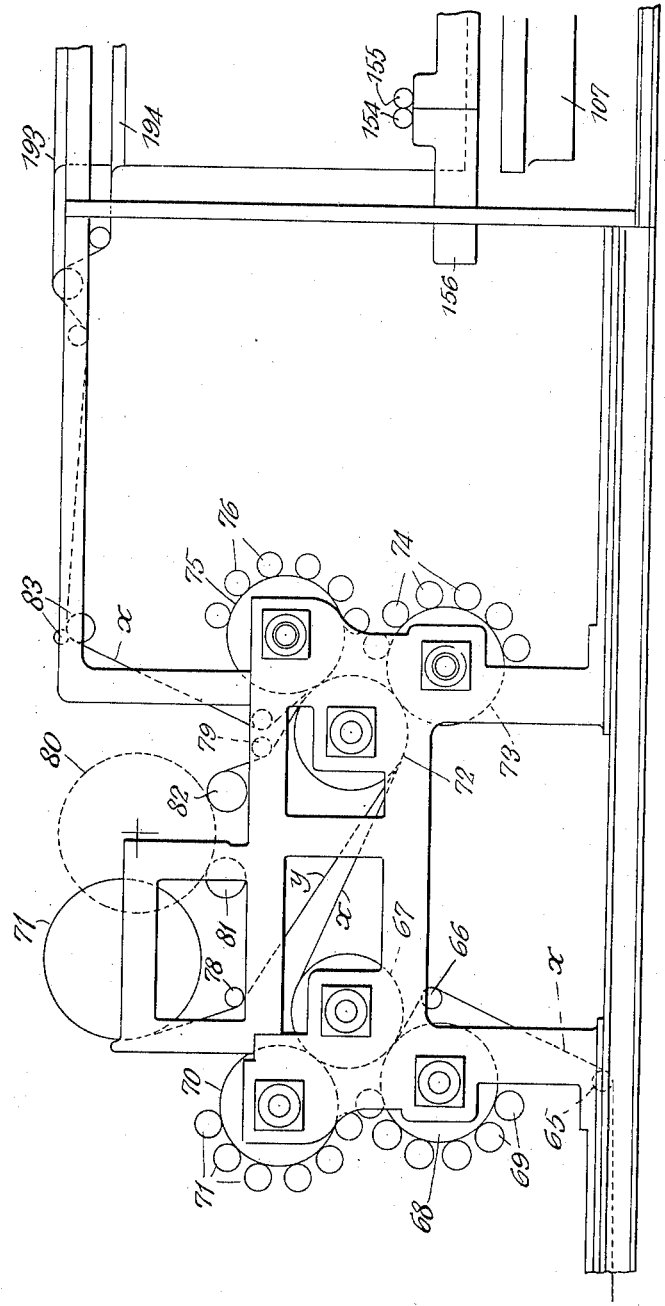

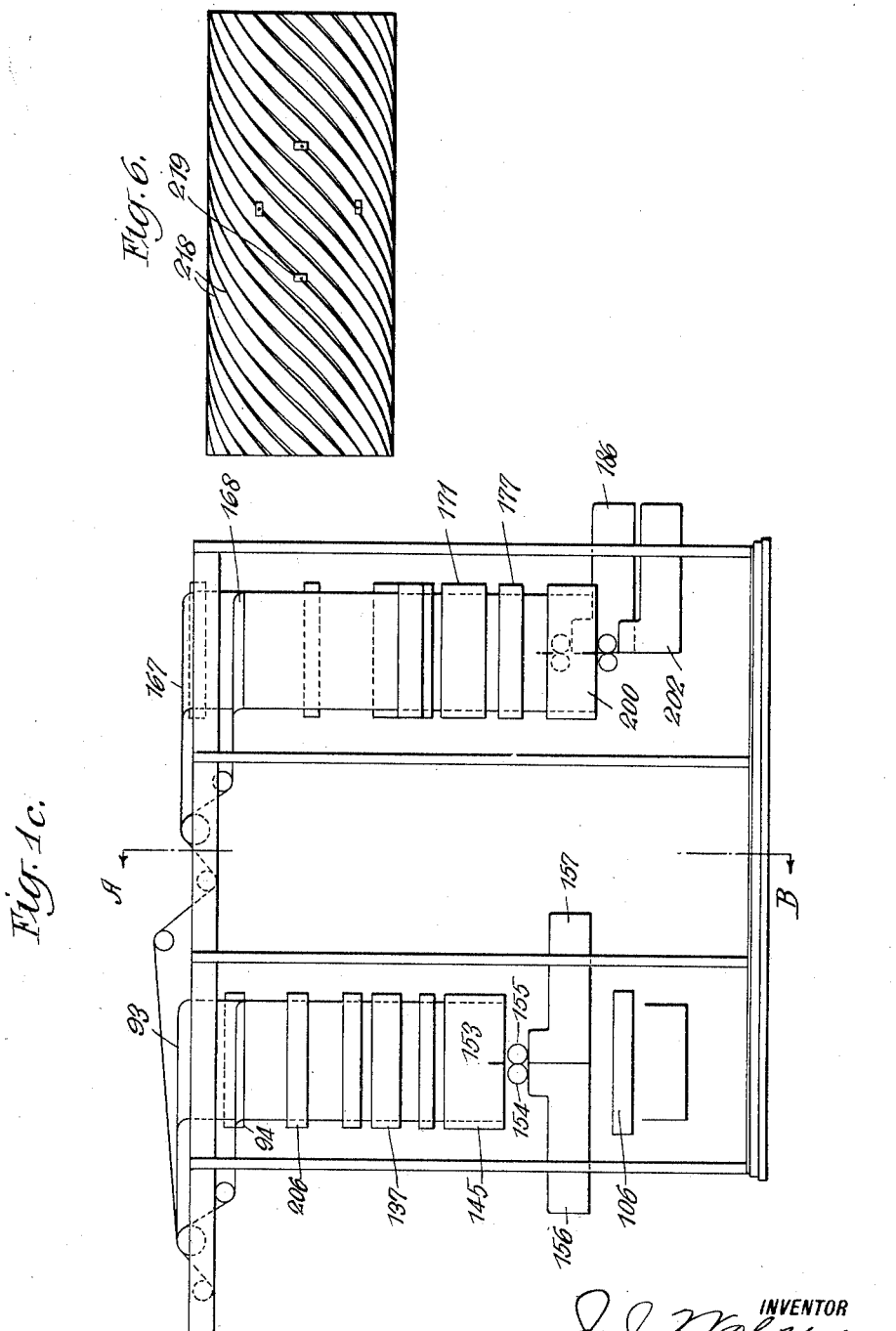

J. J. WALSER.
PRINTING AND FOLDING MACHINE.
APPLICATION FILED SEPT. 20, 1917.
1,373,216.
Patented Mar. 29, 1921.
9 SHEETS—SHEET 4.
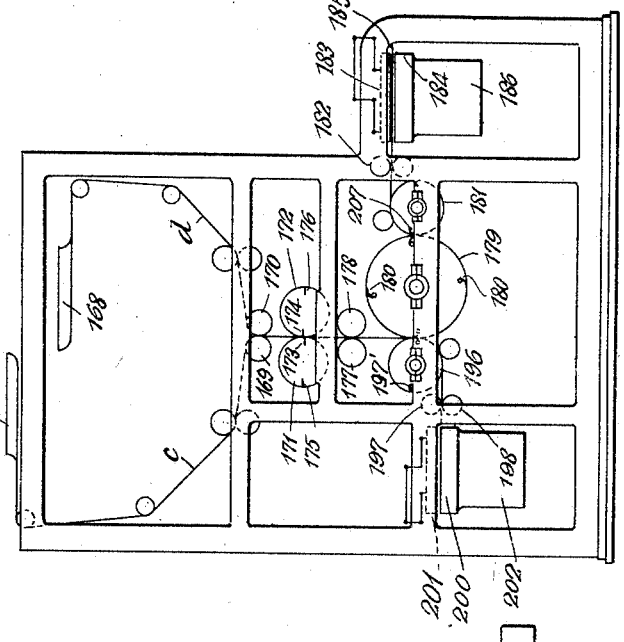
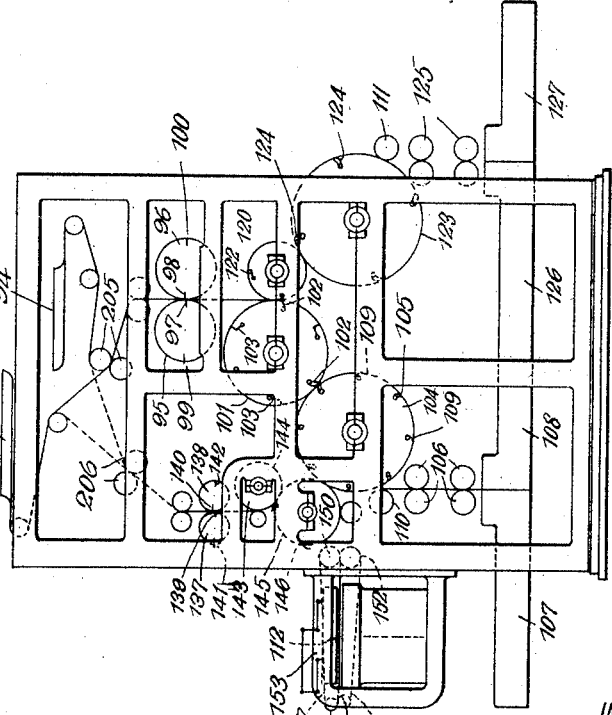
INVENTOR
J. J. Walser
BY
John D. Morgan
ATTORNEY

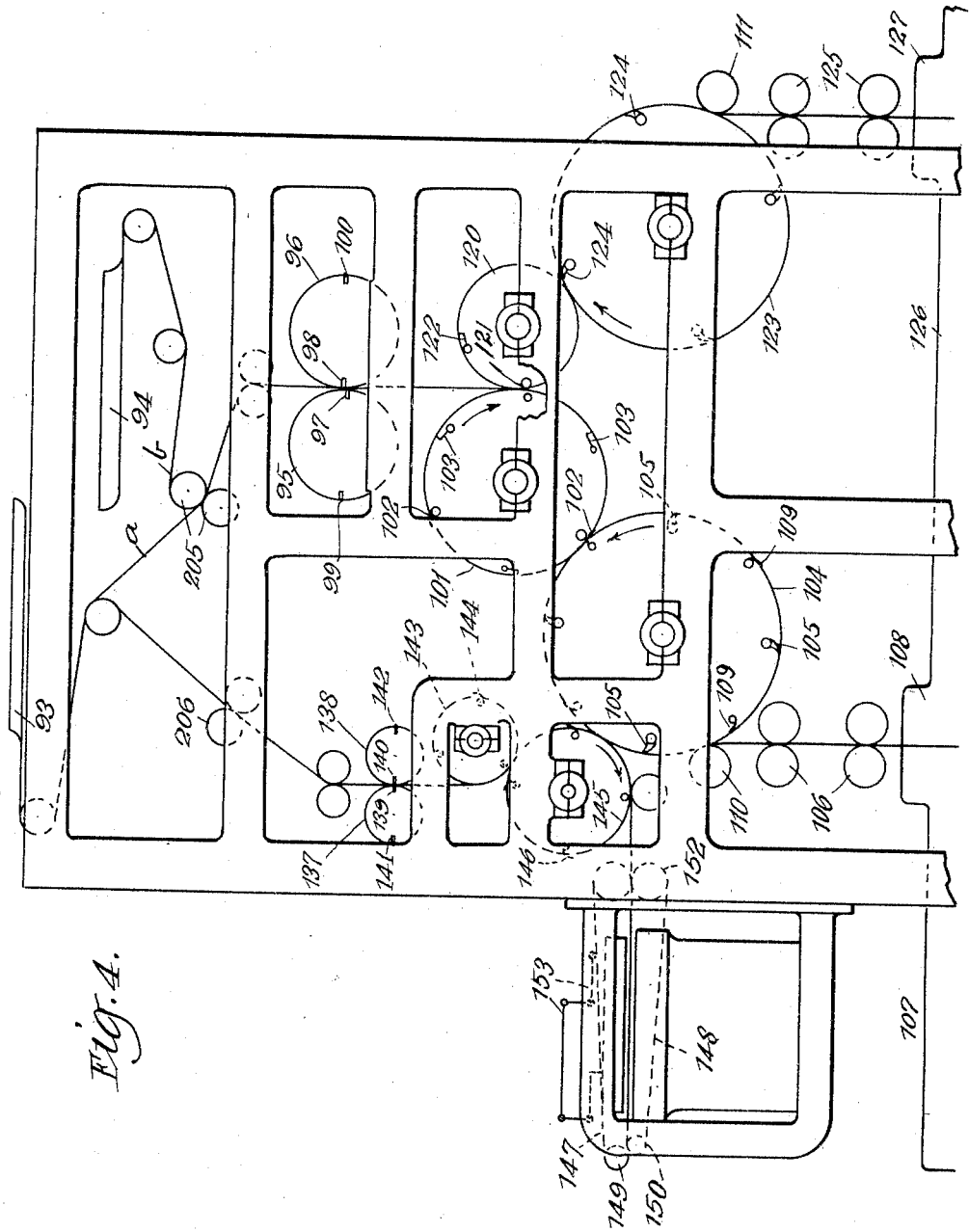

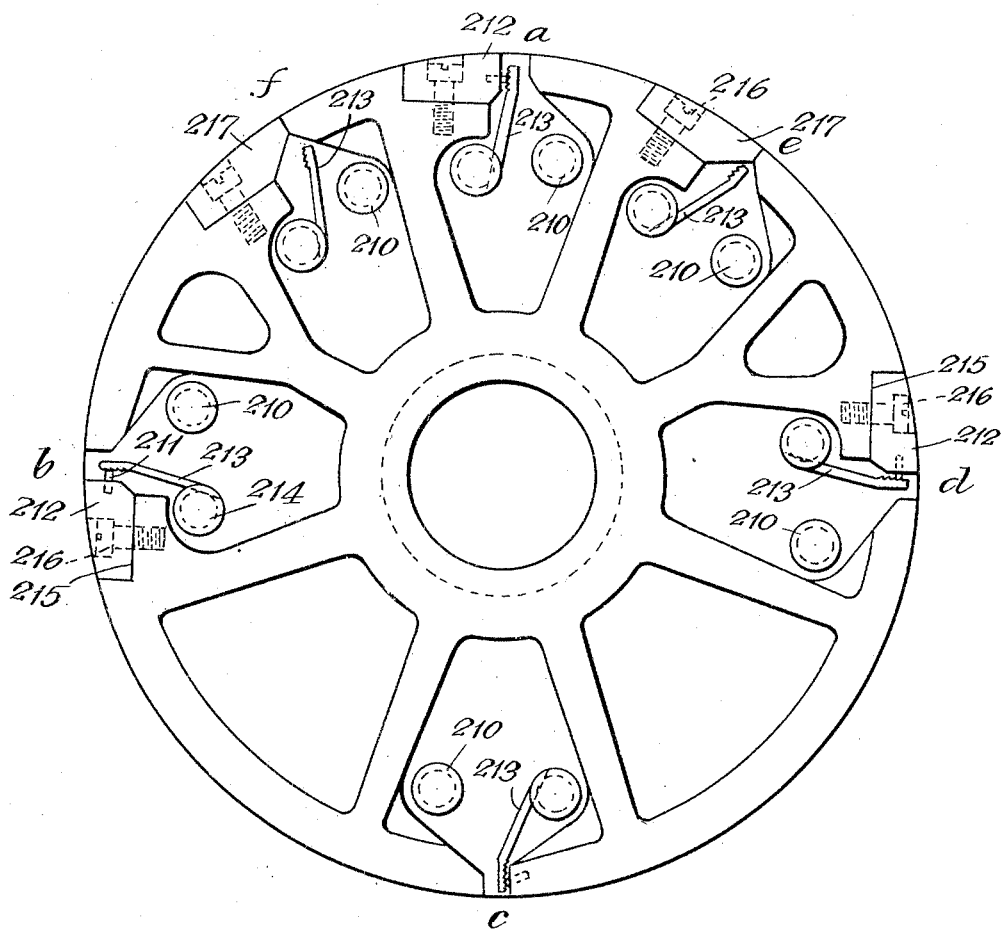

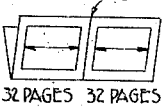

J. J. WALSER.
PRINTING AND FOLDING MACHINE.
APPLICATION FILED SEPT. 20, 1917.

1,373,216.

Patented Mar. 29, 1921.

FIRST CYL.

FOLDED AT HEAD ONLY

SECOND CYL.

ONE-HALF CIRCUMFERENCE OF PLATE CYL. COLLECTED ON CYL. #143
PRODUCTS TRANSFERED TO CYL. #145 AND RECEIVE CHOPPER KNIFE FOLD WITH BLADE #153 AND DELIVERED IN PACKER BOX.

2-32 PAGE PRODUCTS $11\frac{5}{8} \times 8\frac{5}{8}$

FIG. 12

FIRST CYL.

FOLDED AT HEAD ONLY

SECOND CYL.

ONE-QUARTER OF PLATE CYL. CIRCUMFERENCE COLLECTED ON CYL. #143 PRODUCTS TRANSFERED TO CYL. #145 AND RECEIVE CHOPPER KNIFE FOLD WITH BLADE #153 AND DELIVERED TWO SUCCEEDING SHEETS IN PAIRS IN EACH PACKER BOX.

4-16 PAGE PRODUCTS $11\frac{5}{8} \times 8\frac{5}{8}$

FIG. 13

FIRST CYL.

FOLDED AT HEAD ONLY
USING 2 PLATE WIDE ROLL

SECOND CYL.

ONE-QUARTER OF PLATE CYL. CIRCUMFERENCE COLLECTED ON CYL. #143 PRODUCTS TRANSFERED TO CYL. #145 AND RECEIVE CHOPPER KNIFE FOLD WITH BLADE #153 AND DELIVERED TWO SUCCEEDING SHEETS IN PAIRS IN EACH PACKER BOX.

4-8 PAGE PRODUCTS $11\frac{5}{8} \times 8\frac{5}{8}$

FIG. 14

FIRST CYL.

SECOND CYL.

FULL CIRCUMFERENCE OF PLATE CYL. COLLECTED ON CYL. #101 PRODUCTS ARE TRANSFERED TO CYL. #104 AND FROM THERE TO CYL. #145 AND RECEIVE CHOPPER KNIFE FOLD WITH BLADE #153 DELIVERED INTO ONE PACKER BOX.

1-32 PAGE PRODUCT $11\frac{5}{8} \times 17\frac{1}{4}$

INVENTOR
J. J. Walser
BY John D. Morgan
ATTORNEY

J. J. WALSER.
PRINTING AND FOLDING MACHINE.
APPLICATION FILED SEPT. 20, 1917.

1,373,216.

Patented Mar. 29, 1921.
9 SHEETS—SHEET 9.

FIG. 15

FIRST CYL.

| FOLD | SLIT | | FOLD |
|---|---|---|---|
| 11 | 6 | 7 | 10 |
| 15 | 2 | 3 | 14 |
| 11 | 6 | 7 | 10 |
| 15 | 2 | 3 | 14 |

CUT
CUT
CUT

SECOND CYL.

| FOLD | SLIT | | FOLD |
|---|---|---|---|
| 16 | 4 | 1 | 13 |
| 12 | 8 | 5 | 9 |
| 16 | 4 | 1 | 13 |
| 12 | 8 | 5 | 9 |

CUT
CUT
CUT
CUT

ONE-HALF CIRCUMFERENCE OF PLATE CYL. COLLECTED ON CYL.#101 PRODUCTS ARE TRANSFERED TO CYL.#104 AND FROM THERE TO CYL.#145 AND RECEIVE CHOPPER KNIFE FOLD WITH BLADE #153 DELIVERED INTO TWO PACKER BOXES.

2-16 PAGE PRODUCTS $11\tfrac{5}{8}" \times 17\tfrac{1}{4}"$

FIG. 16

FIRST CYL.

| FOLD | | |
|---|---|---|
| | 6 | 3 |
| | 7 | 2 |
| | 6 | 3 |
| | 7 | 2 |

CUT
CUT
CUT

SECOND CYL.

| FOLD | | |
|---|---|---|
| | 8 | 1 |
| | 5 | 4 |
| | 8 | 1 |
| | 5 | 4 |

CUT
CUT

USING 2 PLATE WIDE WEB

ONE-HALF CIRCUMFERENCE OF PLATE CYL. COLLECTED ON CYL.#101 PRODUCTS ARE TRANSFERED TO CYL.#104 AND FROM THERE TO CYL.#145 AND RECEIVE CHOPPER KNIFE FOLD WITH BLADE #153 DELIVERED INTO TWO PACKER BOXES.

2-8 PAGE PRODUCTS $11\tfrac{5}{8}" \times 17\tfrac{1}{4}"$

FIG. 17

FIRST CYL.

| FOLD | SLIT | | FOLD |
|---|---|---|---|
| 19 | 22 | 23 | 16 |
| 14 | 27 | 26 | 15 |
| 10 | 31 | 30 | 11 |
| 6 | 35 | 34 | 7 |
| 2 | 39 | 38 | 3 |

CUT
CUT
CUT
CUT

SECOND CYL.

| FOLD | SLIT | | FOLD |
|---|---|---|---|
| 17 | 24 | 21 | 20 |
| 13 | 28 | 25 | 16 |
| 9 | 32 | 29 | 12 |
| 5 | 36 | 33 | 8 |
| 1 | 40 | 37 | 4 |

CUT
CUT
CUT
CUT

FULL CIRCUMFERENCE OF PLATE CYL. COLLECTED ON CYL.#179 PRODUCTS ARE TRANSFERED TO CYL.#181 AND RECEIVE CHOPPER KNIFE FOLD WITH BLADE #183 AND DELIVERED TO PACKER BOX 1-40 PAGE PRODUCT $13.8" \times 9\tfrac{7}{8}"$

FIG. 18

FIRST CYL.

| FOLD | SLIT | | FOLD |
|---|---|---|---|
| 14 | 19 | 18 | 15 |
| 10 | 23 | 22 | 11 |
| 7 | 26 | 27 | 6 |
| 2 | 31 | 30 | 3 |
| 3 | 7 | 9 | 5 |

CUT
CUT
CUT
CUT

SECOND CYL.

| FOLD | SLIT | | FOLD |
|---|---|---|---|
| 4 | 5 | 8 | 1 |
| 1 | 32 | 29 | 4 |
| 5 | 28 | 25 | 8 |
| 9 | 24 | 21 | 12 |
| 31 | 20 | 17 | 16 |

CUT
CUT
CUT
CUT

8 PAGES    32 PAGES

FOUR-FIFTHS OF PLATE CYL. CIRCUMFERENCE COLLECTED ON CYL.#179 PRODUCTS ARE TRANSFERED TO CYL.#181 AND RECEIVE CHOPPER KNIFE FOLD WITH BLADE #183 AND DELIVERED TO PACKER BOX.

ONE-FIFTH OF PLATE CYL. CIRCUMFERENCE GRIPPED BY CYL. #196 PRODUCTS RECEIVE CHOPPER KNIFE FOLD WITH BLADE #199 AND DELIVERED TO PACKER BOX.

1-32 PAGE PRODUCT }  $13.8" \times 9\tfrac{7}{8}"$
1-8 PAGE PRODUCT }

INVENTOR
J. J. Walser
BY John D. Morgan
ATTORNEY

UNITED STATES PATENT OFFICE.

JOSEPH J. WALSER, OF CHICAGO, ILLINOIS, ASSIGNOR TO GOSS PRINTING PRESS COMPANY, A CORPORATION OF ILLINOIS.

PRINTING AND FOLDING MACHINE.

1,373,216.     Specification of Letters Patent.     Patented Mar. 29, 1921.

Original application filed July 11, 1917, Serial No. 179,830. Divided and this application filed September 20, 1917. Serial No. 192,274.

*To all whom it may concern:*

Be it known that I, JOSEPH J. WALSER, a citizen of the United States, residing in Chicago, in the county of Cook and State of Illinois, have invented certain new and useful Improvements in Printing and Folding Machines, of which the following is a specification.

The invention relates to printing presses and to folding mechanisms therefor, and to such machines wherein printed products of various kinds, and of various sizes, may be printed and folded in different ways and in different sizes of signatures, that is, signatures of different dimensions and of different numbers of pages, and in all or most cases folding the signatures so as to provide three open or free edges on all the signatures, and with the fold either at the top, bottom or back of the printed pages.

Other objects of the invention will be set forth hereinafter in part, or will be obvious herefrom or may be learned by practice with the invention, the same being attained through the means, instrumentalities and combinations pointed out in the appended claims.

The invention consists in the novel parts, constructions, arrangements, combinations and improvements herein shown and described.

The accompanying drawings herein referred to and constituting a part hereof, illustrate one embodiment of the invention, and together with the description serve to explain the principles thereof.

Of the drawings:

Figures 1ª, 1ᵇ and 1ᶜ, taken together and in the order given, are a front elevation of a machine constructed in accordance with the principles of the invention;

Fig. 2 is a view substantially on the line A—B of Fig. 1, looking in the direction of the arrows, and being a transverse elevation of a portion of the folding mechanism;

Fig. 3 is an end view looking at Fig. 1ᶜ from the right;

Fig. 4 is an enlarged view of the central portion of Fig. 2;

Fig. 5 is an end view of one of the impression cylinders of the half-tone press;

Fig. 6 is a side elevation of a form cylinder;

Figs. 7 to 18 are diagrammatic developments of the form cylinders, showing with four, five and eight plates, respectively, around the cylinder, and their respective products with different width webs and as coming from the different collecting and folding cylinders;

Figure 1A:
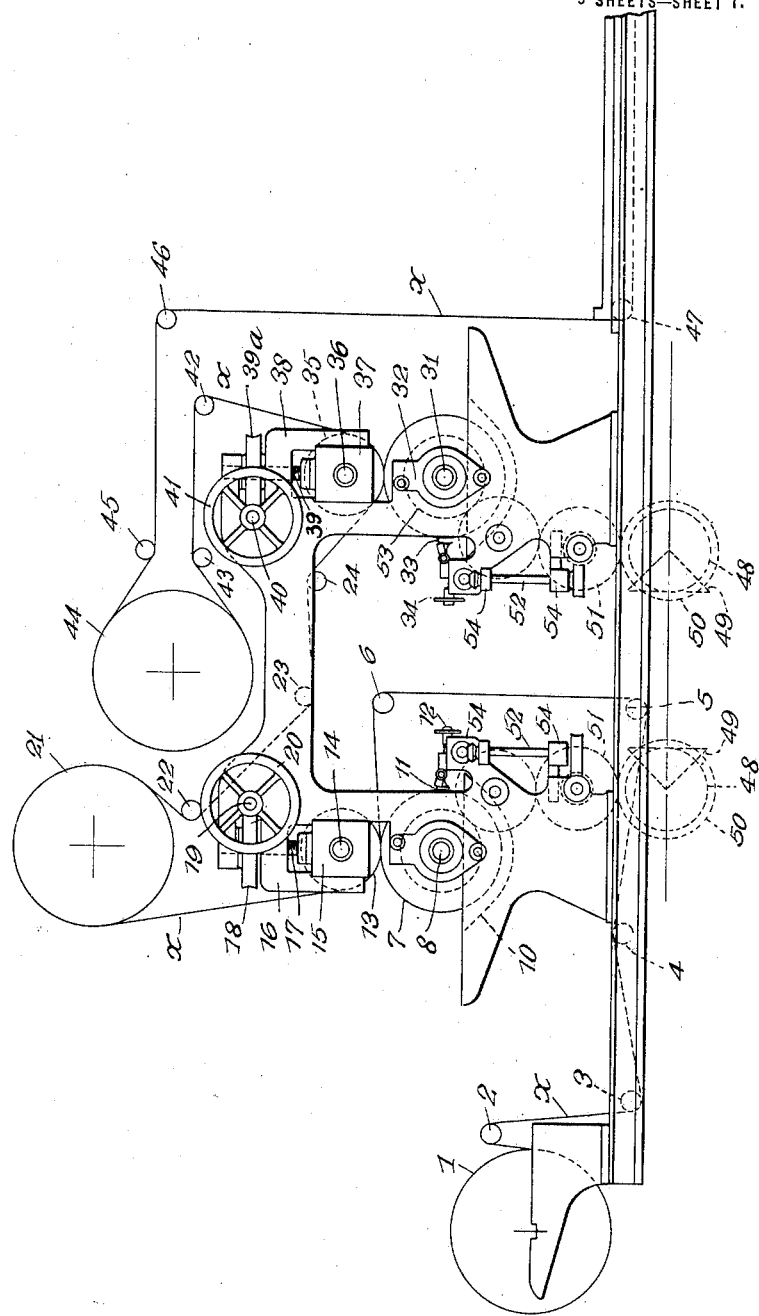

Of these: Figs. 7 to 13 show developments of the form cylinders with eight plates around the form cylinders;

Figs. 14, 15 and 16 show the same but with four plates around the form cylinders; and Figs. 17 and 18 show the same but with five plates around the form cylinders.

It will be understood that the drawings are more or less diagrammatic in character, details of construction being omitted from the various views for the sake of clearness.

Referring by way of example to the illustrated embodiment, there are provided printing means and mechanisms of different kinds adapted to print in different ways, and to print pages of different sizes, to cut sheets of different sizes, folding the sheets in different ways and thereby making the fold in different relation or position with respect to the pages, that is, having the fold either at the top, bottom or back of the pages, and also therewith to produce signatures having different numbers of sheets therein.

More particularly, there are provided intaglio or "rotogravure" printing couples adapted to print on both sides of the web, and in conjunction or coöperation therewith printing mechanisms for printing in one or more colors upon the same web, and more particularly, as embodied, relief or half tone printing mechanisms for printing in two colors upon both sides of the web; the plate or form cylinders being adapted to take plates with the page length extending either along the form cylinders or circumferentially thereabout.

In the exemplified form, further, the plate cylinders are four plates wide, for a given size, and are eight plates around when the page length is disposed along the cylinders, and five plates around when the page length is disposed circumferentially about the cylinders. It will be understood, however, that the invention is not limited in the number or dimensions of the plates upon the form cylinder.

Further, in particular, in connection with the printing mechanism, a folding mechanism is provided which will fold the perfected sheets cut from the web, whether printed with the larger size or smaller size pages, or with different numbers of plates arranged about the form cylinder, including numbers of plates which are not multiples of each other, and will fold the signatures either at the sides of the pages, or at the tops or bottoms of the pages, as may be desired, and in each manner of folding will turn out the signatures with the other three edges thereof free or open, and with signatures varying widely in the number of pages as well as in page size.

Referring more particularly to Fig. 1ᵃ of the drawings, a source of paper supply such as a web roll 1 is provided, the web x therefrom running over rollers 2, 3, 4, 5 and 6, between the first printing couple.

In accordance with one feature of the invention, this printing couple operates on the rotary intaglio or rotogravure principle. The intagliated or engraved cylinder 7 has its shaft 8 supported in demountable bearing 9, of suitable and approved design, said bearings being mounted upon the machine frame. The cylinder 7 rotates in a suitable ink or color fountain 10, the doctor blade or wiper 11 removing the surplus ink from the surface of the cylinder at a point between the color fountain and the impression or printing line. A suitable regulating or adjusting mechanism 12 is provided for the doctor blade 11.

An impression cylinder 13 coöperates with the cylinder 7 to print upon the web x. The cylinder 13 is provided with means for supporting or suspending it and for moving it away during the removal or renewal of the cylinder 7, and for regulating the impression. In the embodied form of such means the shaft 14 of the cylinder is carried in journal blocks 15, which blocks are slidably mounted in the press frame 16. The journal blocks 15 are connected to threaded rods 17, which rods engage threaded holes in the frame 16. Splined to the respective rods 17 are worm wheels or gear wheels 18, which mesh with a thread or worm upon a shaft 19, said shaft being mounted in the press frame, and provided with a hand wheel 20. By turning the hand wheel 20, the cylinder 13 may be moved, positioned and regulated as required with respect to the cylinder 7.

The web x after being printed upon by the cylinders 7 and 13 passes around a suitable drying cylinder 21. The web x then passes about the rollers 22, 23 and 24 and is led between the second intaglio printing couple which may be generally similar to that just described.

In the second printing couple, an intagliated or engraved cylinder 30 has its shaft 31 supported in the demountable bearings 32, of suitable design, carried upon the machine frame, as shown in Fig. 1ᵃ. A doctor or wiping blade 33 coöperates with the cylinder 30 to remove the surplus color from the surface thereof in a well-known manner, the blade 33 being provided with suitable regulating and adjusting mechanism 34.

Coöperating with the cylinder 30 is an impression cylinder 35, having its shaft ends 36 mounted in journal blocks 37, which blocks are reciprocable in guides 38 formed on the machine frame. The blocks 36 are supported by threaded rods 39, which rods are threaded in the machine frame and provided, respectively, at their upper ends with gear or worm wheels 39ᵃ. Meshing with the wheels 39ᵃ are gear teeth or worm threads on the shaft 40, which shaft is mounted on the machine frame and is provided with a hand wheel 41. By turning the hand wheel 41 cylinder 35 is moved upwardly and downwardly as desired to permit ready removal and insertion of the cylinder 30, and to regulate the impression. The web x runs from the cylinders 30 and 35 over rollers 42 and 43, about a suitable drying cylinder 44, and thence about rollers 45, 46 and 47 on to the succeeding mechanism, as will be later described.

Suitable means for driving the mechanism just described are provided, and such means are partially indicated in the drawings. Two sets of bevel gears 48 receive their drive from coöperating bevel gears 49, upon a driven shaft (not shown). Gears 50, 51 and 52 are driven therefrom. Gears 53 on the shafts 8 and 31, respectively, of cylinders 7 and 30 drive their respective cylinders. A suitable vibrating or reciprocating mechanism for the doctor or wiper blades 11 and 33, respectively, are provided, and are indicated generally by reference numeral 54.

The web passes around rollers 65 and 66 to the printing mechanisms shown in Fig. 1ᵇ, the web passing thence about an impression cylinder 67. Coöperating with the impression cylinder 67 is a form or plate cylinder 68, provided with suitable inking mechanism, which is partially shown and is indicated by reference numeral 69. Coöperating also with the impression cylinder 67 is a form or plate cylinder 70, the form cylinder having a suitable inking mechanism which is partially shown, and indicated by 71. The web may thus be printed in two colors upon one side by the mechanism just described.

The web x passes thence to an impression cylinder 72, with which coöperates a plate or form cylinder 73, the form cylinder having a suitable inking mechanism partially shown, and indicated by reference numeral 74. A second plate or form cylinder 75 likewise coöperates with impression cylinder 72. Cylinder 75 is provided with a suitable inking mechanism, which is partially shown, and indicated by reference numeral 76. The web $x$ is thus printed upon the other or opposite side in two colors by the cylinders 72, 73 and 75 just described.

Suitable offset devices are provided, if desired, for the impression cylinder 72 and, as shown, an offset web $y$ is run about the impression cylinder, the web running from its supply roll 77, about roller 78, through the impression in contact with the previously freshly printed side of the web $x$, and thence about a roller 79. The rewinding roll 80 of the offset web rests upon rollers 81 and 82, the roller 82, or if desired both of said rollers, being driven to rewind the web at a uniform surface or linear speed.

Suitable slitting means are provided, and in the embodied form one or more rotary slitters 83 slit the web preparatory to its being directed to the folding mechanism.

Referring to the web associating, sheet cutting and folding mechanism, and more particularly to the devices shown in Fig. 2 and Fig. 4, and in the left hand part of Fig. 1$^c$, turning bars 93 and 94 are provided for directing the parts of the slit web to the cutting and folding devices, in this case the web being slit once centrally and longitudinally. In the embodied form of such devices, there are provided rotary cutters 95 and 96, provided with two coöperating pairs of cutting blades, one pair being designated by 97, 98 and the other pair by 99 and 100.

The sheets cut by the mechanism just described are delivered to two coöperating or alternately operating cylinders. The cylinder 101 is a collecting and folding cylinder, and is provided with grippers 102 for taking the lead of the sheets delivered thereto from the rotary cutters 95 and 96. As embodied, there are three sets of the grippers 102, adapted to coöperate with plates upon the form cylinder in groups or multiples of four, to collect the successive sheets for a signature in a well-known manner.

Cylinder 101 is also provided with a plurality of folding blades 103. Coöperating with cylinder 101 is a cylinder 104, which cylinder is provided with a plurality of folding jaws 105, which coöperate with the respective folding blades 103 to impart an intermediate transverse fold to the sheet or group of sheets. During the folding the sheets are delivered or transferred from the cylinder 101 to the folding jaws 105 on cylinder 104. The folded sheets are delivered from the folding jaws 105 and are run off between a series of rollers 106 and delivered either selectively or alternately to the packer boxes 107 and 108. A slitter 110 may be employed to sever the two signatures one from the other. Suitable guiding devices for the signatures, such as strippers, tapes, etc., will be provided, but are omitted from the drawings for the sake of clearness, as they are old and well known.

The sheet or sheets may also be delivered from cylinder 104 to cylinder 145 and be folded by folders 153 as later more fully described.

Coöperating with the collecting cylinder 101 is a transfer cylinder adapted to take either the lead of the webs just as they are cut, or to take groups of sheets from the collecting cylinder, and to participate in the folding thereof, the folded sheets being delivered at the other side of the machine from those just described. As embodied, cylinder 120 is provided with a series of grippers 121 for taking the lead of the sheet, or group of sheets, and is provided likewise with a folding blade 122. Coöperating with cylinder 120 is a cylinder 123, which cylinder is provided with a plurality of folding jaws 124, which folding jaws coöperate with the folding blade 122 on cylinder 120, to impart an intermediate transverse fold to the sheets, the group of sheets in the making of the fold being delivered from the cylinder 120 into the jaws 124 of cylinder 123. A slitter 111 may be employed to sever the signatures previous to folding. The folded sheets are then delivered and transmitted by a series of rollers 125, and are delivered selectively or alternately to the packer boxes 126 and 127.

Referring more particularly to the devices for folding the narrow sheets at the top, there is shown at the left in Figs. 2 and 4 of the drawings, devices coöperating with certain of the mechanisms already described. Said devices comprise rotary cutters 137 and 138, which are provided with two pairs of coöperating cutters, one pair being indicated by numerals 139 and 140 and the other pair by numbers 141 and 142. The sheets cut off by the rotary cutters are taken by a collecting cylinder 143, which cylinder is provided with a series of grippers 144. The sheets so collected are delivered to a transferring cylinder 145 provided with a series of grippers 146. From the transferring cylinder 145, the collected sheets are delivered into a pathway, which pathway comprises tapes 147 and 148 running over series of rollers 149, 150, 151 and 152. The group of collected sheets are thereby brought to position to be folded by a suitable folding mechanism, which as embodied, comprises a folding blade 153 coöperating with rollers 154 and 155, the folded signatures being delivered either selectively or alternately into packer boxes 156 and 157.

Referring now to the mechanism for cutting and folding at the back sheets whereon the pages are arranged longitudinally of the sheets, being printed by the plates arranged with their length circumferentially about the form cylinders, at the right hand in Fig. 1c, and in Fig. 3, are shown turning bars 167 and 168 for associating the two parts of the web and directing them to sheet cutting and folding mechanisms. The associated parts of the web pass between rollers 169 and 170 to rotary cutters 171 and 172, which are provided with pairs of coöperating cutters, one pair being designated by 173 and 174, and the other by 175 and 176.

The cut sheets are fed optionally through rollers 177 and 178 to a collecting cylinder 179, which is provided with suitable grippers 180 for taking and collecting the sheets. From the cylinder 179 the collected sheets are delivered to a transferring cylinder 181, and therefrom by suitable conveying means, such as a series of rollers 182, to suitable folding mechanism. The embodied form of folding mechanism comprises a blade 183, coöperating with folding rollers 184 and 185, and therefrom the sheets are delivered to a packer box or other receptacle 186.

In position to take the sheets delivered from the rotary cutters 171 and 172 is a transfer cylinder 196 provided with grippers 197'. The transfer cylinder 196 takes sheets from the rotary cutters and conveys them along a suitable pathway, comprising rollers 197, and 198, and directs the sheets to a suitable folding mechanism. As embodied the folding mechanism comprises a reciprocating blade 199 coöperating with folding rollers 200 and 201. The folded sheets are delivered to a packer box 202, or other suitable receptacle.

The manner of operation of the hereinbefore described mechanism is substantially as follows:—

The machine, as already briefly stated, is adapted to produce various sized signatures, both as to the page size and the number of pages, and will fold the signatures, with three edges open, and with the fold either at the back of the pages, or if desired at the top or bottom of the pages (the latter fold being desirable for certain kinds of work such as heavy catalogue work, where a great number of signatures are bound together by a glued flat back). In Figs. 2 and 4 of the drawings is shown the folding mechanism which is used when the plates are put on with their length disposed longitudinally of the form cylinder, and in the present exemplification there are eight plates about the cylinder. In this case the pages are arranged across the web and the sheets. It will be understood, of course, that the dimensions or the number of plates are in nowise restrictive of the invention.

Describing first the mechanism which produces the signatures with the fold at the back or side of the printed pages and with the pages across the web or sheets, the perfected web from the press is slit by the slitters 83, and the two slit portions a and b are directed, respectively, over the turning bars 93 and 94, and are associated or superimposed at the rollers 205. From thence the web is run between the rotary cutters 95 and 96 and is cut into sheets thereby. The leading edge of the successive sheets is taken by the various sets of grippers 102 upon the collecting cylinders 101, and the sheets are there collected, by the usual gripper action, to the desired number. The collecting cylinder is shown as a "three way" cylinder (that is, having three sets of grippers) and is adapted to collect either two or four sheets together at each set of grippers preparatory to folding. The sheets may be forwarded without collecting, when desired.

The single sheets or the groups of collected sheets are delivered alternatively at either side of the folding mechanism, and the sheet or groups of sheets when delivered to the left (in Fig. 2) from cylinder 101 are transversely folded by one of the folding blades 103, and the corresponding or coöperating folding jaws 105 on cylinder 104. When the folding is effected the group of sheets is released by the grippers 102 and is delivered to cylinder 104 in the bite of the folding jaws 105. The folded signatures are cut apart by slitters 110, and are delivered to rollers 106 and therefrom, selectively or alternately, to packer boxes 107 and 108. When the mechanism is so operating grippers 109 are silenced.

The mechanism just described is employed in the present embodiment with eight plates around and four plates along the cylinder. Various products may be secured by running a full width web, or a three quarter width web, and slitting and associating the parts previous to cutting, or by running a half width web, and collecting four on or less. The collecting grippers may also be timed to collect to the full capacity of the form cylinders, or to deliver more than one for each revolution of the form cylinders. There can be secured by the various arrangements, two thirty-two page signatures folded at the back and open on all the three other edges, or two signatures with a submultiple number of pages, such as two sixteen page, or two eight page, or two four page signatures; or one twelve page signature or like kind may be produced.

When the sheet or group of sheets is delivered to the right (in Fig. 2) the two sheets which are simultaneously cut off from the associated webs a and b are delivered together to the grippers 121 upon a transfer cylinder 120. The mechanism could be arranged so that the collecting cylinder could deliver a group of sheets to the transfer cylinder. The folding blade 122 tucks the middle of the sheet into the folding jaws 124, upon cylinder 123, thereby giving the central transverse fold to the sheet or groups of sheets and also simultaneously delivering the sheet or group of sheets to cylinder 123 in the bite of one of the folding jaws 124. The folded signatures are cut apart by slitter 111 and are delivered from cylinder 123 to rollers 125 and are thereby delivered, either selectively or alternatively, to the packer boxes 126 and 127. In this case, with eight plates around and four plates along the cylinder, there may be produced by running either a full width, three quarter width, or half width web, either two eight page signatures, two four page signatures or one twelve page signature, all folded at the back and with three edges or sides open.

Means are provided in coöperation with the foregoing mechanism for folding the sheets, either singly or collected, at either the top or the bottom of the pages instead of at the back edge, said means being adapted also to operate upon sheets of different sizes.

When the sheets of the same size as those which are folded at the back (by the mechanism already described) are to be folded at the top, the sheet or group of collected sheets upon the cylinder 101 is delivered unfolded to the cylinder 104, the sheets being taken from the grippers 102 by the grippers 109. The folding blade 103 and folding jaws 105 are silenced when the machine is so used. The sheet or sheets are transferred from the cylinder 104 to the cylinder 145, the grippers 109 delivering the sheet or group of sheets to the grippers 146. The sheets are then run to the transverse folder 153, which folds them across the top of the pages, the signatures being delivered therefrom, either selectively or alternately, to the packer boxes 156 and 157. This mechanism with the arrangement of plates already assumed, will produce either one thirty-two page signature, or two sixteen, or two eight page signatures, each folded at the end, that is either at the top or bottom.

In this case the pages are the width of two plates with eight plates around the cylinder, and a slitter 112 (Fig. 2) could be employed to separate the two signatures as they pass through the folding rollers 154 and 155. Double width plates could also be used upon the form cylinders, or two narrow plates could be used to print upon a wide page having a corresponding rotogravure impression thereon.

When it is desired to fold the narrower size sheets at the top or bottom of the page, the web or webs and the sheet or sheets are directed for a portion of their course through another part of the mechanism. In such case, the web $a$ or the webs $a$ and $b$ are run through, and if desired associated at, the rollers 206, and are directed therefrom to the rotary cutters 137 and 138. The cut sheets are then taken, and if desired collected, on the collecting cylinder 143. From this cylinder the group of sheets is transferred to the cylinder 145, the grippers 144 transferring the sheets to the grippers 146. The sheets are then directed to the folder 153, these narrower sheets likewise receiving the fold at the top of the sheets and are delivered from the folder, either selectively or alternatively, to the packer boxes 156 and 157.

By the mechanism just described, there may be produced two thirty-two page or four sixteen page signatures with the full width web, or four eight page signatures with a half width web, all folded at the end (top or bottom) and with the other three edges open.

When the plates are arranged upon the form cylinder with the length of the plates extending circumferentially thereabout, the web is directed to the folding mechanism shown in Fig. 3 of the drawings. The slit parts $c$ and $d$ of the web are associated or superimposed by the rollers 169 and 170 and are cut into sheets by the rotary cutters 171 and 172, and the sheets are taken by the collecting cylinder 179.

The form cylinder may be regarded as having five plates thereabout, and the collecting cylinder 179 having four sets of grippers 180 and thus it will collect the sheets in four groups of five sheets each from a single web, or of ten sheets from a half-width superposed web. The groups of collected sheets are delivered successively to transfer cylinder 181, and from thence are forwarded to the folder 183, which folds the sheets and delivers them to the packer box or receptacle 186. This provides for a forty page signature folded at the back, and with three edges thereof open.

If desired, cylinder 196 will take two sheets, and deliver them to the folder 199, to be folded at the back thereby, and delivered to the receptacle 202. In such case the remaining eight sheets will go from collecting cylinder 179 to transfer cylinder 181 and from thence to the folding mechanism 183, and be delivered thence to the receptacle 186. In such case there will be an eight page signature delivered to the receptacle 202, and a thirty-two page signature delivered to receptacle 186. With the last described arrangement, the grippers 180 are arranged to transfer the first two sheets to the grippers 182 upon cylinder 196, and to deliver the last eight sheets to the grippers 207 on cylinder 181.

In Fig. 5 of the drawings is shown an impression cylinder adapted for use with printing plates of different sizes and with the plates arranged either around or along the impression cylinder. The cylinder is shown with its cylindrical surface divided longitudinally into a plurality of sections, and in the longitudinally disposed recesses between the sections are located the devices for holding the stretched packing, blanket, or other covering for the surface of the impression cylinder. In the various recesses are shown, more or less diagrammatically the reels 210, upon which the packing sheets, blankets or the like are wound. The illustrated form of fastening device for the other end of the impression cylinder covering comprises pins 211 set in the face of detachable and interchangeable blocks or bars 212 constituting part of the surface of the impression cylinder. Clamps 213 are mounted upon shafts 214, and press the cover sheets down over the pins 211 in a well known manner.

The blocks or bars 212 are seated in longitudinally disposed recesses 215 formed in the impression cylinder, the bars 212 being held in position by suitable means such as countersunk screws 216. The bars 212 are of such width that a gap is left between the bar and the opposite side of the recess in the impression cylinder, as is shown at $a$, $b$ and $d$ in Fig. 5. Through this gap the covering sheets for the segments of the impression cylinder pass from the fastening means to the reeling and stretching means in the next recess in the impression cylinder.

Interchangeable with the blocks or bars 212 are similar blocks or bars 217, the blocks or bars 217 however, being of sufficient width to entirely close the longitudinally disposed recesses in the impression cylinder. By interchanging the bars 212 and 217 the size and arrangement of the continuous surface sectors or sections of the impression cylinder may be changed, to correspond with changes in the size and position of the plates on the form cylinder. Thus, in the arrangement of the blocks or bars 212 or 217, the packing or blankets of the impression cylinder which extend from $a$ to $b$, from $b$ to $c$, from $c$ to $d$ and from $d$ to $a$, making four equal sections in the surface of the impression cylinder, each such section adapted to coöperate with one or two printing plates upon the form cylinder, and actually coöperating with two plates when there are eight plates around the form cylinder. By interchanging the block 217 at $f$ with the block 212 at $a$, and interchanging block 217 at $e$ with block 212 at $d$, we would then have three sectors or sections in the surface of the impression cylinder, one extending from section $e$ to section $f$, another such sector or section extending from $f$ to $e$, and the other from $c$ to $e$, thus two of the sections would be twice as large as the remaining one. The two larger sections would be adapted to coöperate with two plates upon the form cylinder and the smaller section with one such plate, that is, there would be five plates around the form cylinder.

In Fig. 6 of the drawings is shown a form cylinder adapted to take plates of different sizes. The surface of the form cylinder is provided with helicoidal undercut grooves 218, in which grooves run the plate clamps 219, in a well known manner. Thus the plates may be arranged in the various ways required or indicated herein.

Figs. 7 to 13 show diagrams or developments of the two coöperating perfecting form cylinders of the relief plate or halftone press shown in Fig. 1$^b$, using eight plates about or around the cylinders. These diagrams are applicable to either of cylinders 68 and 70 and of cylinders 73 and 75, the two sets of cylinders, as already stated, providing for printing in two colors, or for overlapping halftone or other illustration and letter press matter.

In Figs. 7 to 13, the developed or diagrammed form cylinders are shown four plates wide, but with eight, five or four plates about or around the cylinders, in the different figures. The direction of rotation is indicated by the arrows alongside the various diagrams.

The numbers on the developments of the plate cylinders indicate the respective plates and pages of the signature, the numbers on the diagram standing in the same direction as the pages or plates on the form cylinder.

In Fig. 7 the plates are arranged eight around the plate cylinders 68 or 70, and 73 or 75, or 68 and 73 and 70 and 75 and occupy the entire circumference thereof, the plates being in two duplicate sets along the cylinders. The perfected web is slit by slitter 83, turned over bars 93 and 94 and associated at rollers 205. The sheets are cut by cutters on cylinders 95 and 96 as indicated in Fig. 7. The cut sheets are collected on cylinder 104, four sheets superposed, and then receive a jaw fold and are thereby delivered to cylinder 104, the fold being at the side of the pages, and are delivered into the packer box 107. The folded signature may be centrally slit or cut by the rotary slitter 110 while on cylinder 104. This produces two 32 page products or signatures, 8½ inches by 11½ inches, for one standard size of press. These are delivered two products to each signature without slitter 110 or one product to each of double the number of signatures, if slitter 110 is used. The reference to dimensions of signatures is in nowise restrictive of the invention, but is made to furnish a basis of comparison between the different numbers and dimensions of plates employed in the illustrated embodiment.

As to the succeeding figures of the drawings, much that has been said as to Fig. 7 will be understood and applied to the remaining figures without repetition.

In Fig. 8, the plates are arranged eight plates around the form cylinders in two successive sets or series of four plates each, and with two duplicate sets of plates along the form cylinders. In this case the web is slit by slitter 83, is then associated by rollers 205, cut by 95, 96 and the sheets are collected in sets or groups of two successive sheets each on cylinder 101, are then transversely folded and delivered into the jaws 109 on cylinder 104. These so collected and folded set are delivered alternately, into the boxes 107 and 108. This gives four sixteen page products 8⅜ inches by 11⅝ inches, which may be delivered two products (i. e. two duplicate sets of sheets or pages) to each signature, there being thus two signatures, or by using slitter 110, four signatures are secured, each consisting of one product.

In Fig. 9, the plates are arranged eight plates around the form cylinders in two successive sets or series of four plates each, and with two duplicate sets of plates along the form cylinders. The web is slit by slitter 83, associated by rollers 205 and cut into sheets at 95, 96. The sheets are collected in groups of two sheets on cylinder 101, and the groups of sheets so collected are folded alternately into the jaws 109 on cylinder 104 and, by means of cylinder 120, into the jaws 124 on cylinder 123, and the products are delivered alternately into the boxes 107, 108, 126 and 127. This gives eight eight page products, 8⅜ inches by 11⅝ inches, two products to each signature, or, if the slitters 110 and 111 are used, it will give one product to the signature.

In Fig. 10, a half width web is used, with eight plates around the form cylinders, in two successive sets or series of four plates each, and with two duplicate sets of plates along the form cylinders. The web is cut into sheets by 95, 96 and are gripped alternately by cylinders 101 and 120. These sheets, respectively, are folded into the jaws 109 on cylinder 104 or, passing from cylinder 120, into jaws 124 on cylinder 123, and are delivered alternately into boxes 107, 108, 126 and 127. This gives eight four page products 8⅜ inches by 11⅝ inches, delivered two products to each signature, or by using the slitters 110 and 111, delivering the signatures separately, that is cut apart.

In Figs. 11, 12 and 13, the plates are arranged around the form cylinders and in conjunction therewith the sheets or signatures are folded at the top or bottom of the pages. Thus the backs of the collected signatures consist of the cut edges of the sheets, instead of the folded edges. This is advantageous for certain methods of binding and with certain kinds of binding machines.

In Fig. 11 the plates are arranged eight plates around the form cylinders in two successive sets or series of four plates each, but there is only one set or series of plates along the form cylinders. The web is slit by slitter 83 and turned on bars 93 and 94 and the parts are associated by rollers 206. The sheets are cut on each page length by 137 and 138, and the sheets are collected four sheets on or superposed on cylinder 143. The collected products are transferred to cylinder 145 and receive a knife or guillotine fold by knife 153 into rollers 154, 155, the fold being, as stated, at the end of the pages and not at the side thereof. The products are then delivered. This gives two thirty-two page products, 8⅜ inches by 11⅝ inches, folded in the manner already described.

In Fig. 12, the plates are arranged eight plates around the form cylinders in four successive sets or series of two plates each, and with only one set or group of plates along the form cylinders. The web is slit at 83, turned at 93, 94 and the parts associated at rollers 206. The web is cut into sheets at every page length by 137 and 138, and the sheets are collected two sheets upon cylinder 143. These groups of two sheets each are transferred to cylinder 145 and from thence to folder 153, 154, 155 where they are folded at the end of the page as already described in connection with Fig. 11. They are delivered alternately into the two boxes beneath the folder. This gives four sixteen page products 8⅜ inches by 11⅝ inches.

In Fig. 13 the plates are arranged eight plates about the form cylinders in four successive sets or series of two plates each, with only two plates along the cylinder in the set. The web is cut at each page length by cutters 137, 138 and the sheets are collected two on or piled on cylinder 143. The collected sheets are transferred to cylinder 145 and receive a fold at the end of the pages, as described in connection with Fig. 11, by folder 153, 154, 155 and the successive products are delivered alternately into the two boxes beneath the folder. This gives four eight page products 8⅜ inches by 11⅝ inches.

The preceding from Fig. 7 to Fig. 13 relates to eight plates around the form cylinders, the collecting and folding being varied as described to secure the different desired products.

In Fig. 14 the plates are arranged four plates about the form cylinders in one set or series, and with four plates in one set or series along the form cylinders. The web is slit by slitter 83, turned on bars 93 and 94, and associated at rolls 205. The sheets are cut on each page length by cutters 95 and 96 and are collected, four sheets on or superposed, on cylinder 101. The groups of collected sheets are transferred unfolded to cylinder 104, and from thence to cylinder 145. The group or bundle of sheets is folded along the edge of the pages by the folder 153, 154, 155. The products consisting of single signatures, that is, one product to the signature, containing 32 pages, 11⅝ inches by 17¼ inches, is delivered into one of the boxes beneath folder 153, 154, 155.

In Fig. 15 the plates are arranged four plates around the form cylinders in two series of two plates each, and with a single set or series of four plates along the form cylinders. The web is slit at 83, passes over bars 93 and 94, and is associated at rollers 205. The sheets are cut at each page length by cutters 95, 96 and are collected two on or superposed on cylinder 104. The groups of two sheets each are transferred unfolded to cylinder 104, from thence to cylinder 145, and are folded along the edge of the page by folder 153, 154, 155 and are delivered into two boxes beneath the folder. This produces two products or signatures of 16 pages each, 11⅝ inches by 17¼ inches.

In Fig. 16, there are four plates arranged around the form cylinders in two series of two plates each, and in a series of two plates along the form cylinders. The web is cut on every page length at 95, 96 and the sheets are collected two on or superposed on cylinder 101. The groups of two sheets are transferred unfolded to cylinder 104 and thence to cylinder 145, and are folded at the sides of the pages at folder 153, 154, 155 and are delivered into two boxes beneath the folder. This produces two eight page signatures or products 11⅝ inches by 17¼ inches.

In Fig. 17 there are five plates arranged in a single series around the form cylinders and four plates in a single series along the form cylinders. The web is slit by slitter 83, turned on bars 167, 168, and the parts are associated at rollers 169, 170. The sheets are cut at every page length by cutters 171, 172, and are collected five sheets superposed on cylinder 179. The groups of five sheets are transferred to cylinder 181, and are forwarded to and folded along the sides of the pages by folder blade 183 and its coöperating rollers 184, 185 and delivered into box 186. This produces one 40 page signature, 9⅞ inches by 13 8/10 inches.

In Fig. 18 there is one series of four plates extending four-fifths of the way around the form cylinders and with four plates extending along the form cylinders. There is an additional series of a single row of four plates extending along the form cylinders. The web is slit by slitter 83, turned over bars 167, 168 and the parts associated at rollers 169, 170. The sheets are cut at every page length by cutters 171, 172. The first group of eight sheets are collected on cylinder 179, are thence transferred to cylinder 181, and are forwarded to and folded by folder 183, 184, 185, and are then delivered into box 186. The other group of two sheets is taken by cylinder 196, and are thence forwarded to and are folded by knife folder 199, 200, 201, and are delivered into box 202. This produces one signature of 32 pages and one signature of eight pages, both 9⅞ inches by 13 8/10 inches in size.

The dimensions of plates and the numbers of plates, while taken from an actual commercial machine, are merely exemplary and illustrative and are in no wise restrictive of the invention.

In connection with the different sizes of signatures and arrangements of plates, it will be recalled that practically unlimited numbers, sizes and arrangements of designs, illustrations, tints, backgrounds and the like can be printed on the web in practically any desired relation to the pages or groups of various numbers of pages of half-tone, letter press and the like printed from the form cylinders. There is thus provided in the one machine the capacity to print at high speed from a web roll books and catalogues of a very wide variety of sizes both as to page size, number of pages, and variety of folds for binding in different ways, with any desired arrangement of half-tone or line illustration with letter press, and an almost infinitely various capacity for independent design, with a tinted or toned background, having a desired or selected unit relation to pages, desired groups of pages, folds or signatures as may be deemed best for catalogues and other work where artistic and unusual arrangements are not only desirable but often of great pecuniary value in attracting attention to goods and thus increasing sales, and for other purposes as well.

It will be understood that changes may be made from the precise construction and arrangements of mechanism shown and described, without departing from the principles of the invention and without sacrificing its chief advantages. This application is a division of my application, Ser. No. 179,830 filed July 11, 1917.

What I claim as my invention and desire to secure by Letters Patent is:—

1. A folding mechanism including in combination sheet supplying means, a collecting cylinder, folding blades carried thereon, a coöperating cylinder having grippers and folding jaws which are selectively silenced, and another folding mechanism to which the grippers forward the sheets when the folding jaws are silent.

2. A folding mechanism including in combination sheet supplying means, a collecting cylinder, folding blades carried thereon, a coöperating cylinder having grippers and folding jaws, the collecting mechanism, the folding blades and jaws and the grippers on the coöperating cylinder being selectively silenced.

3. A folding mechanism including in combination sheet supplying means, a collecting cylinder, two transfer cylinders receiving sheets from the collecting cylinder, and two folding mechanisms, one folding mechanism receiving sheets from one transfer cylinder and the other folding mechanism receiving sheets from the other transfer cylinder.

4. A folding machine including in combination a cylinder adapted to fold sheets transversely or to pass them unfolded, a longitudinal folding blade and rollers, means for delivering the transversely folded sheets from the cylinder and means for forwarding the unfolded sheets from the cylinder to the longitudinal folder.

5. A folding machine including in combination a folding cylinder having a folding jaw and a sheet conveying gripper which are alternatively operable, a longitudinal folding blade and rollers, a delivery taking the transversely folded sheets from the folding jaw and a cylinder transferring unfolded sheets from the gripper to the longitudinal folder.

6. A folding machine including in combination a cylinder having a gripper and a folding blade, a second cylinder having a gripper and a folding jaw, said grippers coöperating to pass an unfolded sheet and said blade and jaw coöperating to pass a folded sheet to said second cylinder, and a folding device adapted to receive the unfolded sheets from said gripper on said second cylinder.

7. A folding machine including in combination a cylinder having a gripper and a folding blade, a second cylinder having a gripper and a folding jaw, said grippers coöperating to pass an unfolded sheet and said blade and jaw coöperating to pass a folded sheet to said second cylinder, a transfer cylinder taking unfolded sheets from the gripper on said second cylinder, and means for folding said sheets.

8. A folding machine including in combination a cylinder having a gripper and a folding blade, a second cylinder having a gripper and a folding jaw, said grippers coöperating to pass an unfolded sheet and said blade and jaw coöperating to pass a folded sheet to said second cylinder, a transfer cylinder taking unfolded sheets from the gripper on said second cylinder, and a folding blade and rollers for folding said sheets.

9. A sheet cutting and folding machine including in combination a small size rotary cutter, a large size rotary cutter, and a common folder therefor, and a folder between one rotary cutter and said common folder and folding at right angles thereto.

10. A sheet cutting and folding machine including in combination a small size rotary cutter, a large size rotary cutter, and a common folder therefor, and a folder between one rotary cutter and said common folder and folding alternatively therewith and at right angles thereto.

11. A sheet cutting and folding machine including in combination a small size rotary cutter, a large size rotary cutter, a common folder for the sheets from both cutters and a folding device adapted to fold the sheets from one of said cutters or to pass it to said common folder.

12. A sheet cutting and folding machine including in combination a small size rotary cutter, a large size rotary cutter, a common folder folding blade and rollers for the sheets from both cutters and a cylinder receiving sheets from one of said cutters and having folding devices thereon and grippers alternatively operable therewith for conveying unfolded sheets forward.

13. A sheet cutting and folding machine including in combination a small size rotary cutter, a large size rotary cutter, a collecting cylinder for each cutter, and a folder receiving sheets from either collecting cylinder, and a folder interposed between one of the rotary cutters and the common folder.

14. A sheet cutting and folding machine including in combination a small size rotary cutter, a large size rotary cutter, a collecting cylinder for each cutter, and a folding blade and folding rollers receiving sheets from either collecting cylinder, and a folding cylinder between one of the rotary cutters and the folding blade and rollers.

15. A sheet cutting and folding machine including in combination a small size rotary cutter, a large size rotary cutter, a collecting cylinder for each rotary cutter, a folding cylinder receiving sheets from one collecting cylinder, a transfer cylinder adapted to receive both size sheets and a folding device receiving the sheets from the transfer cylinder.

16. A sheet cutting and folding machine including in combination a plurality of rotary cutters, cutting sheets of different sizes, means for directing a web selectively thereto, and a plurality of folders receiving sheets from one of said cutters.

17. A sheet cutting and folding machine including in combination a plurality of rotary cutters, cutting sheets of different sizes, means for directing a web selectively thereto, and a plurality of folders, one of said folders receiving sheets from a plurality of said cutters or alternately one of said cutters supplying sheets to a plurality of said folders.

18. A folding mechanism including in combination sheet supplying means, a sheet receiving cylinder, a folding blade carried thereon, a coöperating cylinder having a gripper and a folding jaw which are selectively silenced, and another folding mechanism to which the gripper forwards the sheets when the folding jaw is silent.

19. A folding mechanism including in combination a rotary cutter cutting small printed sheets, a rotary cutter cutting large printed sheets, and a common transfer cylinder receiving sheets from either but not, simultaneously from both cutters, and a folding mechanism receiving the sheets directly from said transfer cylinder.

20. A folding mechanism including in combination a rotary cutter cutting small printed sheets, a rotary cutter cutting large printed sheets, and a common transfer cylinder receiving sheets from either but not, simultaneously from both cutters and a common folder folding the sheets received directly from the transfer cylinder.

21. A folding mechanism including in combination a rotary cutter cutting small sheets, a rotary cutter cutting large sheets, a collecting cylinder for each cutter, and a transfer cylinder receiving sheets from both collecting cylinders.

22. A folding mechanism including in combination a rotary cutter cutting small sheets, a rotary cutter cutting large sheets, a collecting cylinder for each cutter, a transfer cylinder receiving sheets from both collecting cylinders and a folder receiving and folding the sheets from the transfer cylinder.

23. A folding mechanism including in combination a cutter cutting one size sheets, a cutter cutting another size sheets, a collecting cylinder receiving sheets from one cutter, a collecting cylinder receiving sheets from the other cutter, a cylinder receiving sheets from the last-mentioned collecting cylinder, silenceable coöperating folding devices carried by said two last-mentioned cylinders, and a folder for folding both sizes of sheets.

24. A folding mechanism including in combination a cutter cutting one size sheets, a cutter cutting another size sheets, a collecting cylinder receiving sheets from one cutter, a collecting cylinder receiving sheets from the other cutter, a cylinder receiving sheets from the last-mentioned collecting cylinder, silenceable coöperating folding devices carried by said two last-mentioned cylinders, and a folder for folding both sizes of sheets, one of said folders folding transversely and the other folder folding longitudinally of the web.

25. A folding mechanism including in combination a cutter cutting one size sheets, a cutter cutting another size sheets, a collecting cylinder receiving sheets from one cutter, a collecting cylinder receiving sheets from the other cutter, a cylinder receiving sheets from the last-mentioned collecting cylinder, silenceable coöperating transverse folding devices carried by said two last-mentioned cylinders, and a longitudinal folder for folding both sizes of sheets.

26. A folding mechanism including in combination a cutter cutting one size sheets, a cutter cutting another size sheets, a collecting cylinder receiving sheets from one cutter, a collecting cylinder receiving sheets from the other cutter, a folding and transferring cylinder receiving sheets from the last-mentioned collecting cylinder, silenceable coöperating folding devices carried by said two last-mentioned cylinders, and a folder for folding both sizes of sheets and a selectively operable delivery mechanism for receiving sheets from the folding and transferring cylinder.

27. A folding mechanism including in combination a cutter cutting one size sheets, a cutter cutting another size sheets, a collecting cylinder receiving sheets from one cutter, a collecting cylinder receiving sheets from the other cutter, a folding and transferring cylinder receiving sheets from the last-mentioned collecting cylinder, silenceable coöperating folding devices carried by said two last-mentioned cylinders, and a folder for folding both sizes of sheets, one of said folders folding transversely and the other folder folding longitudinally of the web and a selectively operable delivery mechanism for receiving sheets from the folding and transferring cylinder.

28. A folding mechanism including in combination a cutter cutting one size sheets, a cutter cutting another size sheets, a collecting cylinder receiving sheets from one cutter, a collecting cylinder receiving sheets from the other cutter, a folding and transferring cylinder receiving sheets from the last-mentioned collecting cylinder, silenceable coöperating transverse folding device carried by said two last-mentioned cylinders, and a longitudinal folder for folding both sizes of sheets and a selectively operable delivery mechanism for receiving sheets from the folding and transferring cylinder.

29. A folding mechanism including in combination a cutter cutting one size sheets, a cutter cutting another size sheets, a collecting cylinder receiving sheets from one cutter, a collecting cylinder receiving sheets from the other cutter, a folding and transferring cylinder receiving sheets from the last-mentioned collecting cylinder, silenceable coöperating folding devices carried by said two last-mentioned cylinders, and a folder for folding both sizes of sheets and a selectively operable delivery mechanism for receiving sheets from the folding and transferring cylinder and a slitter for slitting the delivered signatures.

30. A folding mechanism including in combination a sheet cutter, two devices taking different numbers of sheets from the cutter, and two folding mechanisms each making transverse folds in the sheet, one folder taking sheets from one of said devices and the other folder taking sheets from the other of said devices.

31. A folding mechanism including in combination a rotary sheet cutter, two cylinders for taking sheets directly from the cutters, two cylinders one coöperating with one of said sheet taking cylinders and the other coöperating with the other sheet taking cylinder, each pair of coöperating cylinders having a folding blade mounted on one cylinder and a coöperating folding jaw mounted on the other cylinder, and rotary slitters operating upon the sheets upon one of the cylinders of each of said pairs.

32. A folding mechanism including in combination a rotary sheet cutter, two cylinders for taking sheets directly from the cutters, two cylinders one coöperating with one of said sheet taking cylinders and the other coöperating with the other sheet taking cylinder, each pair of cylinders having coöperating folding devices, the folding devices of one pair of cylinders being silenceable, and means for taking unfolded sheets from said cylinders.

33. A folding mechanism including in combination a rotary sheet cutter, two cylinders for taking sheets directly from the cutters, two cylinders one coöperating with one of said sheet taking cylinders and the other coöperating with the other sheet taking cylinder, each pair of cylinders having coöperating folding devices, the folding devices of one pair of cylinders being silenceable, and a folder for receiving unfolded sheets from said pair of cylinders and folding them.

34. A folding mechanism including in combination a rotary sheet cutter, two cylinders for taking sheets directly from the cutters, two cylinders one coöperating with one of said sheet taking cylinders and the other coöperating with the other sheet taking cylinder, each pair of cylinders having coöperating folding devices, the folding devices of one pair of cylinders being silenceable, and a folder for receiving unfolded sheets from said pair of cylinders and folding them one folder being transverse and the other folder longitudinal.

35. A folding mechanism including in combination a source of web supply, three sets of cutters cutting sheets of different sizes from the web, web slitting means, a plurality of turning bars for alternatively directing the web to the cutters, and a plurality of folders for alternatively folding the sheets.

36. A folding mechanism including in combination a source of web supply, a plurality of sets of cutters cutting sheets of different sizes from the web, web slitting means located ahead of the cutters, a plurality of turning bars for alternatively directing the web to the cutters, and a plurality of folders for operating alternatively to impart the first fold to the sheets.

37. A folding mechanism including in combination a source of web supply, a plurality of sets of cutters cutting sheets of different sizes from the web, web slitting means located ahead of the cutters, a plurality of devices for alternatively directing the web to the cutters, and a plurality of folders operating alternatively to impart the first fold to the sheets.

38. A folding mechanism including in combination a source of web supply, a plurality of sets of cutters cutting sheets of different sizes from the web, web slitting means, a plurality of turning bars for alternatively directing the web to the cutters, and a plurality of folders for alternatively folding the sheets, one of said folders alternatively folding sheets from a plurality of said cutters.

39. A folding mechanism including in combination a source of web supply, a plurality of sets of cutters cutting sheets of different sizes from the web, web slitting means, a plurality of devices associating the slit parts of the web and for alternatively directing the web to the cutters, and a plurality of folders for alternatively folding the sheets, one of said folders alternatively folding sheets from a plurality of said cutters.

40. A folding mechanism including in combination a small size rotary cutter, a large size rotary cutter, a folder mechanism for alternatively directing sheets thereto from either cutter, and additional means for alternatively folding and delivering the sheets from one of said cutters.

41. A folding mechanism including in combination a small size rotary cutter, a large size rotary cutter, common web associating means for said cutters, a folder mechanism for alternatively directing sheets thereto from either cutter, and additional means for alternatively folding and delivering the sheets from one of said cutters.

In testimony whereof, I have signed my name to this specification, in the presence of two subscribing witnesses.

JOSEPH J. WALSER.

Witnesses:
J. F. KOEHLER,
E. H. GRAHAM.